United States Patent

Klammer

[11] Patent Number: 5,199,205
[45] Date of Patent: Apr. 6, 1993

[54] ILLUMINATED BOBBER

[75] Inventor: Mark S. Klammer, Mankato, Minn.

[73] Assignee: Johnson Fishing, Inc., Mankato, Minn.

[21] Appl. No.: 902,877

[22] Filed: Jun. 23, 1992

[51] Int. Cl.⁵ ............................................. A01K 93/00
[52] U.S. Cl. .......................................... 43/17; 43/17.5
[58] Field of Search .................................... 43/17, 17.5

[56] References Cited

U.S. PATENT DOCUMENTS

| | | | |
|---|---|---|---|
| 2,490,669 | 12/1949 | Burke | 43/17.5 |
| 2,530,100 | 11/1950 | Vanderpool | 43/17 |
| 2,772,504 | 12/1956 | Zerante | 43/17 |
| 2,779,122 | 1/1957 | DeGroff | 43/17 |
| 2,914,879 | 12/1959 | Humes | 43/17 |
| 3,656,251 | 4/1972 | Snider et al. | |
| 3,739,513 | 6/1973 | Durham, Jr. | |
| 4,109,404 | 8/1978 | Preeschl | |
| 4,157,627 | 6/1979 | Tschelisnik | |
| 4,291,484 | 9/1981 | Young | 43/17.5 |
| 4,589,221 | 5/1986 | Mattison | |
| 4,827,655 | 5/1989 | Reed | 43/17.5 |

Primary Examiner—Kurt C. Rowan
Attorney, Agent, or Firm—Foley & Lardner

[57] ABSTRACT

An illuminated bobber including a hollow sealed body member and a hollow transparent guide mounted on the body member, a light device positioned in the guide to illuminate the guide and a hollow transparent float mounted on the guide for movement between the body member and the upper end of the guide to provide a color signal different from the colored signal of the guide when the body member is pulled downward in the water in response to the strike of a fish.

5 Claims, 1 Drawing Sheet

U.S. Patent  Apr. 6, 1993  5,199,205

# ILLUMINATED BOBBER

FIELD OF THE INVENTION

This invention relates to a fishing bobber and more particularly to an illuminated bobber which changes color when a fish strikes a hook attached to the bobber.

BACKGROUND OF THE INVENTION

Many devices have been developed to aid the fisherman in his efforts to catch fish. Among these devices are various types of bobbers which produce a visual signal when a fish strikes a hook attached to the bobber. This signal is usually introduced by illuminating a light when the fish strikes the hook. Most of the devices include a number of movable parts in order to close a switch for the electrical circuit which provides the electrical signal. Examples of such devices include U.S. Pat. No. 3,739,513, issued Jun. 19, 1973, to George M. Durham, Jr., U.S. Pat. No. 3,656,251, issued Apr. 18, 1972, to Albert L. Snider, et al., both of which use a spring to enclose the circuit for the light bulb, U.S. Pat. No. 4,109,404, issued Aug. 29, 1978, to Raymond C. Preeschl, includes a pressurized float with a bellows within the float which is moved in response to movement of the fish line upon striking of the fish, U.S. Pat. No. 4,157,627, issued Jun. 12, 1979, to Rudolf Tschelisnik, a floatable conductive body is provided in the floating device which completes an electrical contact to illuminate the device when a fish strikes and pulls the loading body downwardly in the water. In U.S. Pat. No. 4,589,221, issued May 20, 1986, to Robert N. Mattison, a chemical light device is provided to attract fish to the bait on the hook.

SUMMARY OF THE PRESENT INVENTION

In accordance with the present invention a fishing bobber is provided which is illuminated for night fishing and changes color when a fish strikes. The bobber generally includes a hollow sealed floatable body member, a guide mounted on the top of the body member and formed of a transparent material, an illuminating device mounted within the guide and a float mounted on the guide and formed of a transparent material which is colored a different color than the guide. When the body member is pulled downward in the water, the guide is pulled through the float and the float is then illuminated and the color of the signal is changed to the color of the float, thus alerting the fisherman to the action of the bobber.

Advantageously the illuminating device is completely sealed within the guide and requires no movement to initiate the light, thus the device is economical to manufacture, not subject to corrosion or malfunction due to water getting into the guide.

Other principal features and advantages of the invention will become apparent to those skilled in the art upon review of the following drawings, the detailed description and the appended claims.

Figure 1:
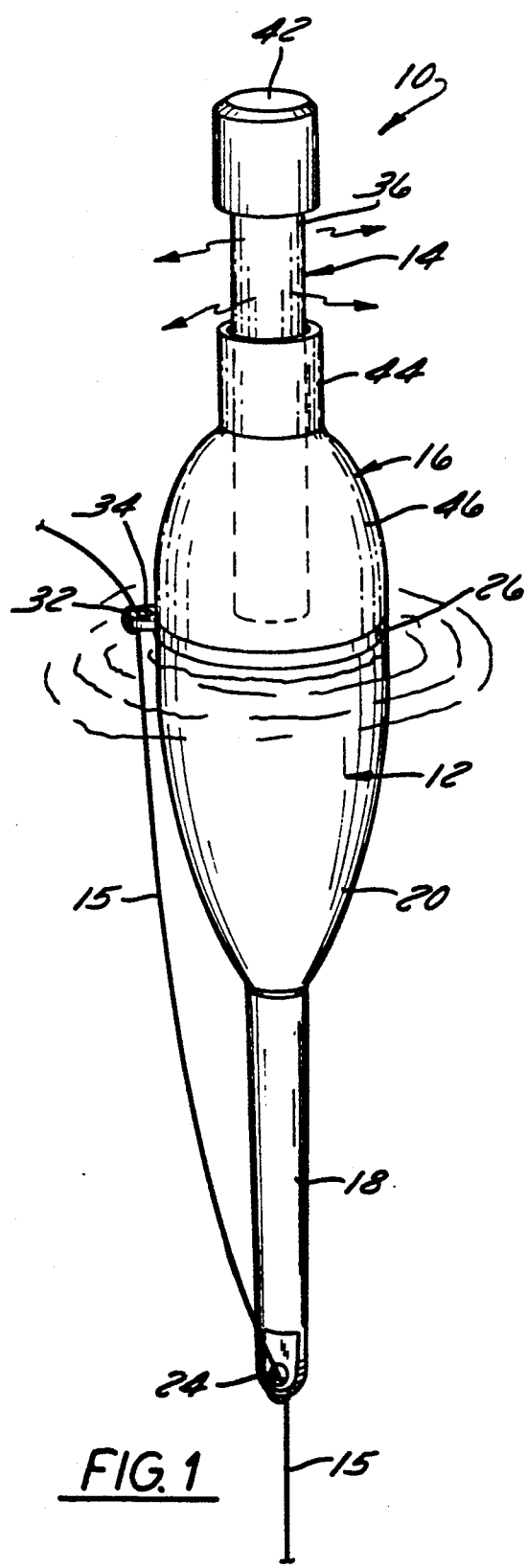
FIG. 1 is a perspective view of the bobber with the float seated on the body member to expose the light.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
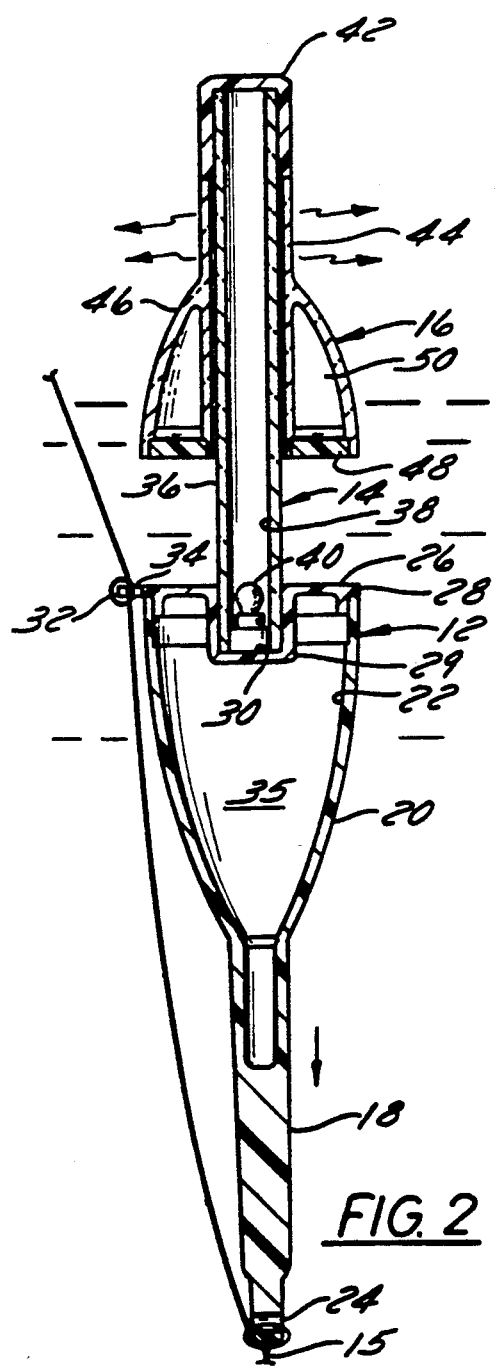
FIG. 2 is a side cross sectional view of the bobber with the float moved up on the guide to change the color of the light.

In accordance with the invention the bobber 10 as shown in FIGS. 1 and 2 generally includes a hollow body member 12 having a transparent guide 14 mounted on the top of the body member 12 and a float 16 mounted on the guide 14. The guide 14 and float 16 are made of transparent material of different colors. The guide 14 when illuminated provides a signal of one color. When a fish strikes the fishing line 15 the body member 12 is pulled downward and the float 16 remains still as the transparent guide 14 is pulled through the float 16 by the body member 12. The float 16 is thereby illuminated by the light from the guide to provide a signal of a different color indicating a strike on the line.

The body member 12 generally includes an elongated shaft 18 and a tapered cup 20 on the upper end of the shaft 18. The cup 20 has a hollow interior 22 and is molded on the upper end of the shaft 18. An opening 24 is provided on the lower end of the shaft 18 for attachment to the fishing line. The cup 20 is closed at the upper end by a cover or frame 26. The cup includes a circular ridge 28 which has a diameter corresponding to the diameter of the top of the cup 20. A boss 29 is provided in the center of the cover which forms a recess 30. A tab 32 is provided on the periphery of the cover 26 which includes an opening 34. The cover 26 is sealed to the top of the cup 22 to form a chamber 35 in the bobber. The shaft 18 provides sufficient weight to stabilize the bobber in a substantially vertical position in the water.

The guide 14 is in the form of a hollow tube 36 having a central passage 38. The guide is positioned in the recess 30 in the cap 26 and is sealed therein to form a chamber for a battery operated light 40 which is turned on and dropped into the guide to illuminate the guide. The guide 14 is formed of a transparent material and colored with a light color such as yellow which when illuminated will glow in the dark. The upper end of the guide 14 is closed by a cap 42 which provides a snug fit to seal the upper end of the passage 38 to protect the light from the water.

The float 16 includes a hollow tubular member 44 having a tapered shell 46 formed on the lower end of the tubular member 44. The bottom of the shell 46 is closed by means of a washer 48 to form a chamber 50 in the shell. The float 16 is mounted on the guide 14 so that it is free to move between the top of the member 12 and the bottom of the cap 42. The float 16 is also made of transparent material colored with a different color such as red which will be illuminated when the tubular member 44 is moved into engagement with the ca 42 at the top of the guide 14. The tubular member 44 will be illuminated by the light in the guide in effect turning "off" the yellow light and turning "on" the red light.

The bobber can be attached to fishing line 15 by passing the fishing line through the opening or eyelet 34 in the cover and the opening 24 at the base of the shaft 18. As is generally understood the fishing line 15 is threaded through opening 34 in the tab 32 and secured to the end of the shaft 18 so that the bobber will be pulled down in the water when a fish strikes the bait on the line.

Thus, it should be apparent that there has been provided in accordance with the present invention an illuminated bobber that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An illuminated bobber comprising a hollow sealed body member, a hollow transparent guide mounted on the top of said body member, means for illuminating said guide to provide a signal and a hollow transparent float mounted on said guide for movement between the body member and the upper end of the guide whereby said transparent float is free to move on said guide when said body member is pulled down in the water in response to a strike by a fish to illuminate the float and change the color of the signal.

2. The bobber according to claim 1 wherein said illuminating means comprises a light device mounted in said guide.

3. The bobber according to claim 2 wherein said light device comprises a battery operated light mounted in said guide.

4. The bobber according to claim 1 including means on the bottom of said body member for stabilizing the vertical relation of the bobber in the water.

5. An illuminated bobber which changes color when a fish strikes, said bobber comprising a hollow, sealed, floatable body member, a hollow colored guide mounted on said body member, illuminating means in said guide to provide a light signal, a float colored a different color than said guide and being mounted on said guide, whereby said guide is pulled through said float when a fish strikes the body member, the float providing a light signal of a color different than the light of the guide when a fish strikes the bobber.

* * * * *